(12) United States Patent
Van Beek et al.

(10) Patent No.: US 11,434,355 B2
(45) Date of Patent: Sep. 6, 2022

(54) EXTERIOR OR SEMI-EXTERIOR AUTOMOTIVE PART

(71) Applicant: SABIC GLOBAL TECHNOLOGIES B.V., Bergen Op Zoom (NL)

(72) Inventors: Dimphna Johanna Maria Van Beek, Geleen (NL); Koen Batinas-Geurts, Geleen (NL); Rick Robert Emilie Bercx, Geleen (NL); Sander Knauf, Geleen (NL); Sarah Van Mierloo, Geleen (NL); Mark Feekes, Geleen (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 255 days.

(21) Appl. No.: 16/472,571

(22) PCT Filed: Dec. 19, 2017

(86) PCT No.: PCT/EP2017/083602
§ 371 (c)(1),
(2) Date: Jun. 21, 2019

(87) PCT Pub. No.: WO2018/114984
PCT Pub. Date: Jun. 28, 2018

(65) Prior Publication Data
US 2019/0322851 A1    Oct. 24, 2019

(30) Foreign Application Priority Data

Dec. 23, 2016  (EP) ................................. 16206549
Dec. 23, 2016  (EP) ................................. 16206558
Oct. 16, 2017  (EP) ................................. 17196653

(51) Int. Cl.
  C08L 23/12    (2006.01)
  C08L 23/14    (2006.01)
  C08L 23/08    (2006.01)
  C08K 5/13     (2006.01)

(52) U.S. Cl.
  CPC ............. *C08L 23/14* (2013.01); *C08K 5/13* (2013.01); *C08L 23/0815* (2013.01); *C08L 2205/02* (2013.01); *C08L 2207/02* (2013.01); *C08L 2207/04* (2013.01)

(58) Field of Classification Search
  CPC .......... C08L 23/12; C08L 23/14; C08L 23/08; C08K 5/13
  USPC ......................................................... 524/451
  See application file for complete search history.

(56) References Cited

U.S. PATENT DOCUMENTS

| 6,348,536 B1 | 2/2002 | Fourty et al. |
| 2013/0123413 A1 | 5/2013 | Lederer et al. |
| 2018/0002515 A1 | 1/2018 | Grein et al. |
| 2018/0208755 A1 | 7/2018 | Batinas-Geurts |
| 2020/0102449 A1 | 4/2020 | Van Beek |

FOREIGN PATENT DOCUMENTS

| EP | 1408080 A1 | 4/2004 | |
| EP | 2108679 A1 | 10/2009 | |
| EP | 2386602 A1 | 11/2011 | |
| EP | 2410007 | 1/2012 | |
| EP | 2711391 A1 | 3/2014 | |
| EP | 2781548 A1 | 9/2014 | |
| WO | 2010000660 A1 | 1/2010 | |
| WO | 2011023594 A1 | 3/2011 | |
| WO | 2014044680 A1 | 3/2014 | |
| WO | WO-2014146923 A1 * | 9/2014 | ............... C08J 5/00 |
| WO | WO-2015028955 A1 * | 3/2015 | ............... C08K 3/40 |
| WO | 2015091151 A1 | 6/2015 | |
| WO | 2015091810 A1 | 6/2015 | |
| WO | 2016102422 A1 | 6/2016 | |
| WO | 2017012896 A1 | 1/2017 | |
| WO | 2017012986 A1 | 1/2017 | |
| WO | 2018114977 A1 | 6/2018 | |
| WO | 2018114979 A1 | 6/2018 | |
| WO | 2018114984 A1 | 6/2018 | |

OTHER PUBLICATIONS

International Search Report; International Application No. PCT/EP2017/083602; International Filing Date: Dec. 19, 2017; dated Mar. 16, 2018; 5 pages.

(Continued)

*Primary Examiner* — Deve V Hall
(74) *Attorney, Agent, or Firm* — Cantor Colburn LLP

(57) ABSTRACT

The present invention relates to an exterior or semi-exterior automotive part prepared from a thermoplastic composition comprising:

from 48-95 wt. % heterophasic propylene copolymer; wherein said heterophasic propylene copolymer consists of i) a propylene-based matrix, and ii) a dispersed ethylene-α-olefin copolymer comprising ethylene and at least one C3 to C10 α-olefin;

from 0-20 wt. % ethylene-α-olefin elastomer comprising ethylene and at least one C3 to C10 α-olefin; from 1 up to 30 wt. % high aspect ratio (HAR) talc as a filler;

from 0 to 5 wt. % of another talc;

from 0.05-1 wt. % phenolic antioxidant additive;

from 0.05-1 wt. % amphiphilic protective additive comprising a hydrophilic part and a hydrophobic part; and from 0-3 wt. % additional additives. It moreover relates to a method of producing these and to the use of such a composition for the manufacture of an exterior or semi-exterior part in automotive applications.

11 Claims, No Drawings

(56) References Cited

OTHER PUBLICATIONS

Peacock, Andrew J., "Handbook of Polyethylene", Chapter 3 Production Processes, 2000, Marcel Dekker, Inc., New York; ISBN 0824795466; p. 43-66.
Soares et al. "Polyolefin Reactors and Processes" Polyolefin Reaction Engineering, First Edition, Chapter 4, 2012, pp. 1-43.
VDA 278 "Thermal Desorption Analysis of Organic Emissions for the Characterization of Non-Metallic Materials for Automobiles", Oct. 2011, pp. 1-19.
Written Opinion; International Application No. PCT/EP2017/083602; International Filing Date: Dec. 19, 2017; dated Mar. 16, 2018; 7 pages.
Wenguang; "IV Fillers' Physical Morphologies"; Design of Plastic Formulation; Chemical Industrial Press; 1998; pp. 400-401.

\* cited by examiner

EXTERIOR OR SEMI-EXTERIOR AUTOMOTIVE PART

CROSS REFERENCE TO RELATED APPLICATIONS

This application is a 371 of International Application No. PCT/EP2017/083602, filed Dec. 19, 2017, which is incorporated by reference in its entirety, and which claims priority to European Application Serial No. 16206549.4 filed Dec. 23, 2016, European Application Serial No. 16206558.5 filed Dec. 23, 2016, and European Application Ser. No. 17196653.4 filed Oct. 16, 2017.

The present invention relates to an exterior or semi-exterior automotive part, preferably an automotive bumper fascia or a cowl top prepared from a thermoplastic composition, and to the use of a thermoplastic composition for the manufacture of an automotive part. In particular, the invention relates to an exterior or semi-exterior automotive part, being a bumper fascia or a cowl top.

In the automotive industry polypropylene based materials are often used for their desirable combination of good mechanical properties and low cost. In particular so called impact propylene copolymers are often used in applications like bumper fascia, cowl tops, instrument panels, pillar trims and door panels. The requirements for automotive applications include low Coefficient of Linear Thermal Expansion (CLTE), good impact strength, good stiffness, and good optical surface properties. In order to obtain a low CLTE together with the desired mechanical properties the polypropylene based materials usually contain a certain amount of inorganic filler, such as in particular talc.

The addition of talc, however, is known to deteriorate the optical surface properties. In particular it increases the risk for so called "tiger stripes (TS)". Tiger stripes as used herein refers to color and gloss variations on the surface of an injection molded article, which occurs because of unstable mold filling properties of the molten polymer as it is being injected into the mold and formed into the desired shape. Usually these variations can be observed as alternating areas of low and high gloss and/or light or darker color, wherein the areas usually are substantially perpendicular to the flow direction of an injection molded article. Tiger stripes may also be referred to as tiger marks or tiger (flow) markings. Tiger stripes typically occur in polypropylene based materials containing polypropylene, a rubber dispersed in the polypropylene and an inorganic filler, in particular talc. Tiger stripes are undesirable in automotive applications, in particular in case where the polypropylene based material is not provided with an additional layer such as paint or a laminating layer.

Emissions from interior thermoplastic automotive parts has been an issue receiving serious considering for interior parts since said emissions could adversely affect vehicle interior air quality, and thus lead to a concern regarding the health of drivers and passengers. However, exterior or semi-exterior thermoplastic automotive parts, the latter being parts on the boundary of interior and exterior, such as the automotive bumper or a cowl top, may also lead to emissions. In the automotive industry, there is a trend towards high performance products with reduced weight. Fillers are required to achieve the required strength of the automotive parts. Short glass fibers (SGF) are often used as fillers. Talc is also often used as fillers, especially high aspect ratio (HAR) talc (explained in detail below). A disadvantage of the current compositions is that they have a certain emission of volatile organic compounds (VOCs) that is above desired levels.

Accordingly, it is an object of the invention to provide a material for typical use in an exterior or semi-exterior automotive part, especially a bumper fascia or a cowl top, having high impact resistance and low emission. It is a further object of the present invention to provide a thermoplastic material having a desired combination of mechanical properties that is inter alia suitable for the manufacture of exterior or semi-exterior automotive parts, in particular bumper fascias or a cowl tops. The present inventors surprisingly found that one or more of these objects can be met by a specifically defined reinforced composition.

Accordingly, the present invention is directed at an exterior or semi-exterior automotive part prepared from a composition as disclosed in claim 1. The composition combines a reduced emission with high stiffness and therefore is very suitable as a material for preparing an exterior or semi-exterior automotive part. The present invention is related to both unpainted automotive parts and automotive parts that may be painted. The semi-exterior automotive parts are unpainted, whereas the exterior automotive parts may be both unpainted and painted.

Definitions

"exterior automotive part" as used in the present description means an automotive part that is present on the exterior part of a vehicle, for example a bumper.

"semi-exterior automotive part" as used in the present description means an automotive part that is present on, or connects to, both the exterior and the interior part of a vehicle, for example a cowl top.

"bumper" as used in the present description means a structure that is attached to or integrated in the front and rear of a vehicle intended to absorb impact in a (minor) collision; the structure usually consists of a cover of fascia—to which the present invention is related—over a reinforcement bar, e.g. made of metal or composite. When in the present invention bumper is cited, bumper fascia is meant.

"cowl top" as used in the present description means the front part of the vehicle's frame that supports the rear of the hood, windshield, dashboard, pedals and instrument panel. The cowl or cowl top separates the passenger compartment from the engine.

"vehicle" as used in the present description means any motorized means of transport having at least 4 wheels, including cars, vans, busses, trucks etc.

"VOC" as used in the present description means: Volatile Organic Compounds having a boiling point of ≥50° C. and <260° C. and also including Very Volatile Organic Compounds (VVOC) having a boiling point of <50° C. This is measured in units of microgram per gram sample according to VDA 278 *"Thermal Desorption Analysis of Organic Emissions for the Characterization of Non-Metallic Materials for Automobiles"*, October 2011, 180° C., 30 min on the granulated compounds or on injection molded plaques. Injection molded plaques are stored in airtight bags at a maximum temperature of 23° C.

"SVOC" as used in the present description means: Semi Volatile Organic Compounds having a boiling point of >260° C. and <400° C. This is measured in units of microgram per gram sample according to VDA 278 *"Thermal Desorption Analysis of Organic Emissions for the Characterization of Non-Metallic Materials for Automobiles"*, October 2011, 180° C., 30 min on the granulated compounds or on injection molded plaques. Injection molded plaques are stored in airtight bags at a maximum temperature of 23° C.

"FOG" as used in the present description means: the sum of VOC and SVOC. This is measured in units of microgram per gram sample according to VDA 278 *"Thermal Desorption Analysis of Organic Emissions for the Characterization of Non-Metallic Materials for Automobiles"*, October 2011, first heating 90° C., 30 min, second heating 120° C., 1 hour on the granulated compounds or on injection molded plaques. Injection molded plaques are stored in airtight bags at a maximum temperature of 23° C.

"TVOC" as used in the present description means the Total VOC. This is measured in units of microgram of carbon per gram sample according to VDA 277 *"the analysis of volatile contaminants from polymers"*, 1995 on the granulated compounds or on injection molded plaques. Injection molded plaques are stored in airtight bags at a maximum temperature of 23° C.

"thermoplastic composition" as used in the present description means a composition comprising at least one thermoplastic polymer.

"polymer" as used in the present description includes homopolymers and all types of copolymers.

"heterophasic propylene copolymer" as used in the present description means a copolymer having at least a two-phase structure, consisting of a propylene-based (semi-crystalline) matrix and a dispersed ethylene-α-olefin copolymer forming the rubber phase. These heterophasic polypropylenes are generally prepared in a series of reactors, by polymerization of propylene in the presence of a catalyst system, and subsequent polymerization of a propylene-α-olefin mixture. However, they may also be made by blending different (co)polymers. Heterophasic propylene copolymers are sometimes referred to as impact copolymers since one of the advantages of heterophasic polypropylene is improved impact resistance, especially at lower temperatures.

"propylene-based matrix" as used in the present description means a composition consisting of one or more polypropylenes. For the avoidance of doubt it should be understood that the propylene-based matrix essentially consists of said one or more polypropylenes and does not contain any other materials in an amount more than 2 wt. %. Or, said in another way, the propylene-based matrix consists of at least 98 wt. %, preferably at least 99 wt. % of one or more polypropylenes. It may be propylene homopolymers or propylene copolymers.

"ethylene α-olefin copolymer" as used in the present description means a copolymer that is prepared from ethylene and at least one other α-olefin monomer having from 3 to 10 carbon atoms (C3-C10 α-olefin monomer) that forms the dispersed phase within the propylene-based matrix phase. The ethylene α-olefin copolymer forms the rubber content (RC) of the heterophasic propylene copolymer.

"ethylene α-olefin elastomer" as used in the present description means an additional elastomer that might be present in the composition. Such ethylene α-olefin elastomers are sometimes also referred to as plastomers. It is not the same as the ethylene α-olefin copolymer present in the heterophasic propylene copolymer. The elastomer is prepared from ethylene and at least one other C3-C10 α-olefin monomer.

"HDPE" as used in the present description means a polyethylene having a density of between 940 and 970 kg/m$^3$.

"high aspect ratio (HAR) talc" as used in the present description means a talc having a high aspect ratio, such as talc having a lamellarity of at least 2.8.

"aspect ratio" as used in the present description means a ratio of the smallest diameter of a talc particle over the largest diameter of a talc particle orthogonal to the smallest diameter. The aspect ratio approaches zero for a very elongated particle (that is the particle has a high aspect ratio) and is 1 for a perfectly round particle.

"other talc" as used in the present description means a talc not being a HAR talc, for example a fine talc (having a d50 of 2 micrometer or an ultrafine talc (having a d50 of less than 2 micrometer).

"phenolic antioxidant additive" as used in the present description means an antioxidant additive that comprises one or more phenolic groups, preferably phenolic groups having one or more substituents on the aromatic ring, preferably said substituents are substituted alkyls, such as iso-propyl or tert-butyl groups.

"protective additive" as used in the present description means a shielding agent that reduces emission. Without wishing to be bound to a particular theory the present inventors believe that this shielding agent (partly) coats the phenolic antioxidant additive, thereby reducing any breakdown reaction thereof, in turn leading to a reduction in emission.

"fatty amides" as used in the present description means an amide that is formed of an amine and a fatty acid.

"fatty bis amide" or "bis amide of fatty acids" as used in the present description means a bis amide that if formed of two fatty acids and a alkyl-bis-amine. "additional additives" as used in the present description means other additives besides the phenolic antioxidant additive and the protective additives.

"tiger stripes" as used in the present invention means a visual defect on the surface of the objects, whereby a(n) (alternating) pattern of light and dark stripes can be observed. Tiger stripes are measured using the method described herein.

SUMMARY OF THE INVENTION

The present invention relates in a first aspect to an exterior or semi-exterior automotive part prepared from a thermoplastic composition as disclosed in claim 1.

In an embodiment, the composition comprises between 1 and 20 wt. %, based on the weight of the composition of an ethylene-α-olefin elastomer comprising ethylene and at least one C3 to 010 α-olefin.

In an embodiment, the composition comprises >0.1 to 0.5 wt. %, on the weight of the composition the at least one amphiphilic protective additive.

In an aspect, the present invention relates to an exterior or semi-exterior automotive part prepared from a thermoplastic composition consisting of:

a) from 48-95 wt. % based on the weight of the composition of at least one heterophasic propylene copolymer;

b) from 0-20 wt. %, preferably between 1 and 20 wt. %, based on the weight of the composition of an ethylene-α-olefin elastomer comprising ethylene and at least one C3 to C10 α-olefin;

c) from 1-30 wt. %, preferably from more than 5 up to 30 wt. % based on the weight of the composition of high aspect ratio (HAR) talc as a filler;

d) from 0 to 5 wt. % based on the weight of the composition of another talc;

e) from 0.05-1 wt. % based on the weight of the composition of a phenolic antioxidant additive;

f) from 0.05-1 wt. %, preferably >0.1 to 0.5 wt. %, based on the weight of the composition of at least one amphiphilic protective additive comprising a hydrophilic part and a hydrophobic part, wherein said hydrophobic part preferably comprises at least one substituted or un-substituted alkyl group having at least 12 carbon atoms; and g) from 0-3 wt. % based on the weight of the composition of one or more additional additives; and wherein the total of a), b), c), d), e), f) and g) is 100 wt. %.

In an embodiment, no other talc is present, in other words less than 0.01 wt. %, preferably 0 wt. % of another talc is present. In an embodiment, no glass is present, in other words less than 0.01 wt. %, preferably 0 wt. % of glass is present. This relates to all types of glass, such as short fiber glass (SFG) or long fiber glass (LFG). In an embodiment, no HDPE is present, in other words less than 0.01 wt. %, preferably 0 wt. % of high density polyethylene (HPDE) is present. In an embodiment, no SEBS is present, in other words less than 0.01 wt. %, preferably 0 wt. % of styrene-ethylene-butylene-styrene (SEBS) is present.

In an embodiment, the heterophasic propylene copolymer consists of i) a propylene-based matrix consisting of a propylene homopolymer and/or a propylene-α-olefin copolymer, said propylene-α-olefin copolymer consisting of at least 70 wt. %, preferably at least 90 wt. % of propylene and at most 30 wt. %, preferably at most 10 wt. % of α-olefin, based on the total weight of the propylene-α-olefin copolymer, wherein the propylene-based matrix is present in an amount of 60 to 95 wt. % based on the total weight of the heterophasic propylene copolymer; and ii) a dispersed ethylene-α-olefin copolymer comprising ethylene and at least one C3-C10 α-olefin; wherein the dispersed ethylene-α-olefin copolymer is present in an amount of 40 to 5 wt. % based on the total weight of the heterophasic propylene copolymer; and wherein the sum of the total amount of propylene-based matrix and the total amount of dispersed ethylene-α-olefin copolymer in the heterophasic propylene copolymer is 100 wt. %.

In an embodiment, the amount of ethylene in the ethylene-α-olefin copolymer is in the range of 20-65 wt. % based on the weight of the ethylene-α-olefin copolymer. The amount of ethylene in the ethylene-α-olefin copolymer may be determined using $^{13}C$ NMR as is known to the person skilled in the art. The α-olefin in the ethylene-α-olefin copolymer is chosen from the group of ethylene and C3-C10 α-olefins. Preferably, the α-olefin is chosen from the group of α-olefins having 3 to 8 carbon atoms and any mixtures thereof, preferably the α-olefin in the ethylene-α-olefin copolymer is propylene.

According to a preferred embodiment of the invention the density of HDPE ranges between ≥940 and ≤970 kg/m³, preferably ≤968 kg/m³, for example ≤967 kg/m³, for example ≤966 kg/m³, for example ≤965 kg/m³ (measured according to ISO 1183-1:2012). According to a further preferred embodiment of the invention the density of HDPE ranges between ≥950 and ≤967 kg/m³ (measured according to ISO 1183-1:2012). According to a further preferred embodiment of the invention the density of HDPE ranges between >950 and <965 kg/m³ (measured according to ISO 1183-1:2012).

The production processes of the HDPE is summarised in "Handbook of Polyethylene" by Andrew Peacock (2000; Dekker; ISBN 0824795466) at pages 43-66. Suitable catalysts for the production of polyethylene include Ziegler Natta catalysts, chromium based catalysts and single site catalysts. The polyethylene may be obtained for example by polymerizing ethylene and optionally at least one olefin comonomer in slurry in the presence of a silica-supported chromium-containing catalyst and an alkyl boron compound. Suitable comonomers include for example propylene, 1-butene, 1-pentene, 4-methyl-1-pentene, 1-hexene and/or 1-octene.

In a first embodiment the composition comprises a heterophasic propylene copolymer, said heterophasic propylene copolymer (HPC-D) comprising: i) from 70 to 92 wt. % based on the weight of said heterophasic propylene copolymer of a propylene-based matrix consisting of a polypropylene having a melt flow index of at least 150 g/10 min; and wherein the propylene polymer has an intrinsic viscosity $IV_{DP}$; ii) from 8 to 30 wt. % based on the weight of said heterophasic propylene copolymer of a dispersed ethylene-α-olefin copolymer having an ethylene content of between 10 and 55 wt. % based on the weight of the ethylene-α-olefin copolymer and wherein the ethylene-α-olefin copolymer has an intrinsic viscosity $IV_{EPR}$; and wherein the ratio of $IV_{EPR}/IV_{PP}$ is between 3 and 7, preferably between 3 and 5. More information and embodiments related to this first embodiment can be found in WO2015/091810 on page 3 line 10 to page 7, line 3; which section is incorporated by reference.

In a second embodiment, the composition comprises a heterophasic propylene copolymer (HPC-A) comprising: 1) from 70 to 90 wt. % based on the weight of the heterophasic propylene copolymer of a polypropylene-based matrix consisting of a polypropylene having a melt flow index of from 55 to 85 g/10 min; and 2) from 10 to 45 wt. % based on the weight of the heterophasic propylene copolymer of a dispersed-ethylene-α-olefin copolymer having a melt flow index of from 2.5 to 5.0 g/10 min. More specific embodiments of this second embodiment can be found in WO2015/091151 on page 7, line 11 to page 8, line 34; which section is incorporated by reference.

In a third embodiment, the composition comprises a heterophasic propylene copolymer (HPC-B) comprising: a) from 60 to 85 wt. % based on the weight of the heterophasic propylene copolymer of a polypropylene-based matrix consisting of a polypropylene having a melt flow index of from 50 to 250 g/10 min, preferably from 50 to 100 g/10 min; and b) from 15 to 40 wt. % based on the weight of the heterophasic propylene copolymer of a dispersed ethylene-α-olefin copolymer having a melt flow index of from 0.050 to 0.30 g/10 min. More specific embodiments of this third embodiment can be found in WO2015/091151 on page 9, line 1 to page 10, line 20; which section is incorporated by reference.

In a fourth embodiment, the composition comprises a first and a second heterophasic propylene copolymer (HPC-A&B) in a weight ratio of between 1:1 and 10:1 of A) said first heterophasic propylene copolymer comprising: A1) from 70 to 90 wt. % based on the weight of the first heterophasic propylene copolymer of a first polypropylene-based matrix consisting of a polypropylene having a melt flow index of from 55 to 85 g/10 min; and A2) from 10 to 45 wt. % based on the weight of the first heterophasic propylene copolymer of a first dispersed-ethylene-α-olefin copolymer having a melt flow index of from 2.5 to 5.0 g/10 min; B) said second heterophasic propylene copolymer comprising: B1) from 60 to 85 wt. % based on the weight of the second heterophasic propylene copolymer of a second polypropylene-based matrix consisting of a polypropylene having a melt flow index of from 50 to 250 g/10 min, preferably from 50 to 100 g/10 min; and 82) from 15 to 40 wt. % based on the weight of the second heterophasic propylene copolymer of a second dispersed ethylene-α-olefin copolymer having a melt flow index of from 0.050 to 0.30 g/10 min. More specific embodiments of this fourth embodiment can be found in WO2015/091151 on page 5, line 32 to page 6, line 20 and page 10 line 22 to page 17, line 6; which section is incorporated by reference.

In a fifth embodiment the composition comprises a heterophasic propylene copolymer (HPC-C), said heterophasic propylene copolymer having a melt flow rate of at least 40 g/10 min and a FOG value of at most 500 μg/g, at most 400 μg/g, preferably at most 350 μg/g. Preferably, wherein said heterophasic propylene copolymer is obtained by visbreaking of an intermediate heterophasic propylene copolymer in a shifting ratio, which complies with the following formula:

$$0.0011x^2 - 0.011x + 1 \leq \text{shifting ratio} \leq -0.0009x^2 + 0.1963x + 1$$

wherein x stands for the melt flow rate of the final heterophasic propylene copolymer obtained after visbreaking of the intermediate heterophasic propylene copolymer, wherein the shifting ratio is the melt flow rate of the final heterophasic propylene copolymer divided by the melt flow rate of the intermediate heterophasic propylene copolymer.

The composition may also comprise a combination of two or more of the heterophasic propylene copolymers according to the first and/or second and/or third and/or fourth and/or fifth embodiments, viz. HPC-D, HPC-A, HPC-B, HPC-A&B, and HPC-C respectively.

In an embodiment that may be combined with the first aspect of the invention, with the first, second, third, fourth and fifth embodiments the composition has a tensile modulus of at least 1200 MPa, preferably at least 1500 MPa, preferably at least 2000 MPa, more preferably at least 2100 MPa. In an embodiment, wherein the amount of HAR talc as a filler is at least 25 wt. % based on the weight of the composition, preferably the composition has a tensile modulus of at least 2200 MPa, preferably at least 2400 MPa, more preferably at least 2600 MPa.

In an embodiment that may be combined with the first aspect of the invention, with the first, second, third, fourth and fifth embodiments the composition has an Izod impact strength of at least 1.5 kJ/m$^2$ at −20° C. and/or at least 35 kJ/m$^2$ at 23° C. (tough failure) for an exterior automotive part. In an embodiment that may be combined with the first aspect of the invention, with the first, second, third, fourth and fifth embodiments the composition has an Izod impact strength of at least 1.5 kJ/m$^2$ at 0° C. and/or at least 10 kJ/m$^2$ at 23° C. for a semi-exterior automotive part. In an embodiment that may be combined with the first aspect of the invention, with the first, second, third, fourth and fifth embodiments the composition has a flexural modulus of at least 1300 MPa (or N/mm$^2$), preferably at least 1400 MPa, more preferably at least 1500 MPa even more preferably at least 1800 MPa, further preferred at least 2000 MPa. In an embodiment, wherein the amount of HAR talc as a filler is at least 20 wt. % based on the weight of the composition, preferably the composition has a flexural modulus of at least 1800 MPa, preferably at least 2000 MPa. In an embodiment that may be combined with the first aspect of the invention, with the first, second, third, fourth and fifth embodiments the composition has a warpage of at most 1.4, preferably at most 1.2. In an embodiment, the warpage is at least 0.6, preferably at least 0.8. The warpage depends amongst others on the amount of HAR talc that is used. In an embodiment that may be combined with the first aspect of the invention, with the first, second, third, fourth and fifth embodiments the composition has an emission of volatile organic compounds (VOCs) of at most 250 microgram/gram, preferably at most 200 microgram/gram, more preferably at most 150 microgram/gram.

In an embodiment that may be combined with the first aspect of the invention, with the first, second, third, fourth and fifth embodiments the composition has a Total carbon emission (TVOCs) of at most 50 microgram of carbon/gram, preferably at most 40 microgram of carbon/gram, more preferably 20 microgram of carbon/gram. In an embodiment, wherein the amount of HAR talc as a filler is at least 20 wt. % based on the weight of the composition, preferably the composition has a TVOCs of at most 20 microgram of carbon/gram, preferably at most 15 microgram of carbon/gram. In a tenth embodiment, that may be combined with the first aspect of the invention, with the first, second, third, fourth, fifth, sixth, seventh, eighth, and ninth embodiments, the composition has a melt flow index between 5 and 70, preferably 10 to 45 g/10 min.

In an embodiment that may be combined with the first aspect of the invention, with the first, second, third, fourth and fifth embodiments a light stabilizer is present as additional additive, preferably wherein the automotive part has a tiger stripe value of at least 7. Preferably, in said embodiment HPC-D is used as the composition. This embodiment of the composition is preferably used for unpainted automotive parts.

In an embodiment, said automotive part comprises at least 90 wt. %, preferably at least 95 wt. %, more preferably at least 99 wt. % or even 100 wt. % of the composition according to the invention. In other words, said automotive part may consist of said composition.

The present invention relates in a second aspect to a method for the manufacture of the exterior or semi-exterior automotive part comprising preferably thermoforming or injection molding the composition according to the invention as the first aspect or any of the embodiments thereof, such as the first, second, third, fourth, and/or fifth embodiments. The composition may be processed by any conventional processing technique known in the art into a shaped article. Suitable non-limiting examples include injection molding, rotational molding, compression molding, extrusion and extrusion compression molding. The present invention relates in fourth and third aspects to respectively a composition as disclosed in claim 14 and to its use for the manufacture of an exterior or semi-exterior part in automotive applications. Please note that the embodiments (e.g. the first, second, third, fourth and fifth embodiments) disclosed above and below are also applicable to each of the other aspects (second, third, and fourth).

Thermoplastic Composition

The composition according to the present invention comprises the following components that will each be discussed in detail below: heterophasic propylene copolymer; optionally an ethylene-α-olefin elastomer; high aspect ratio talc; phenolic antioxidant additive; protective additive; and optionally additional additives. More information about the preparation and parameters of the composition are discussed below.

Heterophasic Propylene Copolymer

The composition may comprise one or more heterophasic propylene copolymers. In case the composition comprises two grades of heterophasic propylene copolymer each preferably have distinct and different characteristics, allowing mechanical and melt flow properties to be balanced with good tiger stripe performance.

In the embodiment wherein the composition comprises two types of heterophasic propylene composition, for example the melt flow index of the first polypropylene and the second polypropylene may be the same or different.

For the purpose of the present invention the combined amount of polypropylene-based matrix and dispersed ethylene-α-olefin copolymer in the heterophasic propylene copolymer is 100 wt. % based on the weight of the heterophasic propylene copolymer. In other words, preferably in addition to the polypropylene and ethylene-α-olefin copolymer no other materials are comprised in the heterophasic propylene copolymer except for an optional small amount of stabilizers and/or additives common in the art.

Polypropylene: Manufacture

The heterophasic propylene copolymers employed in the present invention can be produced using any conventional technique known to the skilled person, for example multistage process polymerization, such as bulk polymerization, gas phase polymerization, slurry polymerization, solution polymerization or any combinations thereof.

The person skilled in the art is aware of what type of reactors are suitable for the preparation of heterophasic propylene copolymers. For example, Polyolefin Reaction Engineering by J. B. P. Soares and T. F. L. McKenna, July 2012 gives an overview of reactor and processes which are suitable for the production of polypropylene in Chapter 4. For example, the heterophasic propylene copolymer may be prepared in two stages using a first and a second gas-phase reactor, wherein in the first reactor the propylene and optional C3-C10 α-olefin are reacted to form the polypropylene matrix and wherein in the second reactor the polypropylene matrix and the ethylene are reacted with the C3-C10 α-olefin to form the heterophasic propylene copolymer. For example, the gas phase reactors are horizontal stirred gas-phase reactors.

Such polymerisation processes are carried out by contacting the monomers with a catalyst, such as a metallocene or a Ziegler Natta type of catalyst. Ziegler Natta catalyst systems are known in the art and comprise a catalyst component, a co-catalyst component and an external donor. The catalyst component of the catalyst system primarily contains magnesium, titanium, halogen and an internal donor. Electron donors control the stereo specific properties and/or improve the activity of the catalyst system. A number of electron donors including ethers, esters, polysilanes, polysiloxanes, and alkoxysilanes are known in the art. Heterophasic propylene copolymers suitable for use in the invention are known to the person skilled in the art and are commercially available from for example SABIC, Borealis, Total etc.

Propylene-Based Matrix

The heterophasic propylene copolymer comprises a propylene-based matrix consisting of a propylene homopolymer and/or a propylene-α-olefin copolymer, said propylene α-olefin copolymer consisting of at least 70 wt. %, preferably at least 90 wt. % of propylene and at most 30 wt. %, preferably at most 10 wt. % of α-olefin, based on the total weight of the propylene α-olefin copolymer. For the avoidance of doubt, the α-olefin, in the propylene α-olefin copolymer is a monomer other than propylene. Suitable α-olefins include ethylene, 1-butene, 1-pentene, 1-hexene, 1-heptene, 1-octene, 1-nonene, 1-decene and 4-methyl-1-pentene; ethylene being preferred in view of its availability and relative ease of manufacture.

Dispersed Ethylene-α-Olefin Copolymer

In addition to the propylene(s) at least one ethylene-α-olefin is present in the heterophasic propylene copolymer as the dispersed rubber phase. The melt flow index of the ethylene-α-olefin copolymer is said to be "in accordance with ISO1133" for the reason that this melt flow index was calculated rather than actually measured. The calculation was carried out as follows:

$$Log(MFI_{copol})=X_{matrix}*Log(MFI_{matrix})+X_{disperse}*Log(MFI_{disperse})$$

wherein: $MFI_{copol}$=Melt flow index of the heterophasic propylene copolymer; $MFI_{matrix}$=Melt flow index of the matrix phase, i.e. the polypropylene; $MFI_{disperse}$=Melt flow index of the disperse to be calculated; and $X_{matrix}$ and $X_{disperse}$ represent the weight fractions of the matrix and disperse phase respectively.

Ethylene-α (Alpha)-Olefin Elastomer

The composition according to the present invention may further comprise from 0-20 wt. %, based on the weight of the composition, of an ethylene α-olefin elastomer. Such ethylene α-olefin elastomer is preferably selected from one or more of ethylene-butene elastomer, ethylene-hexene elastomer and ethylene-octene elastomer.

Even more preferably, the ethylene α-olefin elastomer is selected from one or more of an metallocene ethylene octene elastomer and a metallocene ethylene butene elastomer. Typically, these elastomers are added to further improve the impact resistance. The density of such elastomers may be from 860-885 kg/m³. The melt flow index for the elastomer may be from 0.10-10 g/10 min (ISO1133:2005, 2.16 kg, 230° C.). Preferably, the composition according to the present invention comprises from 5-20 wt. %, or 7-18 wt. %, or 10-15 wt. % of elastomer.

Elastomers which are suitable for use in the current invention are commercially available for example under the trademark EXACT' available from Exxon Chemical Company of Houston, Tex. or under the trademark ENGAGE' polymers, a line of metallocene catalyzed plastomers available from Dow Chemical Company of Midland, Mich. or Nexlene™ from SK Chemicals. Commercially available examples of suitable ethylene α-olefin elastomers are Tafmer DF605, Tafmer DF740, H5030S from Mitsui Chemicals America Inc, Engage 7447, Engage 8200, Engage 8207 from DOW, Exact 9371, Exact 9061 from Exxon, LC565, LC165, LC170 from LG, Fortify C5070D from SABIC.

High Aspect Ratio Talc

High aspect ratio (HAR) talc is known for its use as a filler in compositions. High aspect ratio talc is discussed in U.S. Pat. No. 6,348,536 of Luzenac, which patent is incorporated by reference in this application regarding the disclosure of the talc. Talc is a natural mineral that may be processed in order to arrive at HAR talc. The present composition may comprise from more than 1 at up to 30 wt. %, preferably from more than 5 at up to 30 wt. % of high aspect ratio (HAR) talc as a filler.

As a comparative talc, not according to the invention can be mentioned ultrafine talc (e.g. available as Ultra 5-HTP talc) having a lamellarity index of less than 2.8.

The high aspect ratio talc preferably is a powder. The high aspect ratio talc preferably has a lamellarity index of more than 2.8, preferably 3.5, more preferably more than 4.0, even more preferably more than 4.5. The lamellarity index characterizes the shape of the particle, and more particularly its flatness (large dimension/thickness). The lamellarity index will be measured by the difference between, on the one hand, the value of the mean dimension of the particles of the powder obtained by a particle size measurement by Malvern laser diffraction using a wet method (standard AFNOR NFX11-666) and on the other hand, the value of the mean diameter D50 obtained by a measurement by sedimentation using a "Sedigraph" (standard AFNOR X11-683), this difference being related to the mean diameter D50 (see also the description thereof in U.S. Pat. No. 6,348,536). As commercially available examples of HAR talc Luzenac HAR® W92 and T84 or can be mentioned. These HAR talcs have a lamellarity index of at least 2.8.

Phenolic Antioxidant Additives

The present thermoplastic composition comprises from 0.05-1 wt. % of a phenolic antioxidant additive. Said phenolic antioxidant additive may comprise one, two or more phenolic groups. These phenolic antioxidant additives may be sterically hindered phenolic additives.

In an embodiment, the phenolic antioxidant comprises an alkyl ester (i.e. propionic) group. For example, the phenolic antioxidant may comprise a C8-24 alkyl ester (i.e. propionic) group, preferably a C12-20 alkyl ester group, more preferably a C14-18 alkyl ester (i.e. propionic) group. The alkyl group is preferably a linear alkyl group. In other words, the phenolic antioxidant comprises an alkyl propionate group. Non-limiting examples of phenolic antioxidants with one phenolic group are the group of alkyl-3-(3,5-di-t-butyl-4-hydroxyphenyl) esters, such as $C_{1-20}$-alkyl-3-(3,5-di-t-butyl-4-hydroxyphenyl)propionates, preferably wherein said $C_{1-20}$-alkyl is methyl, octyl, isooctyl, tridecyl, tetradecyl, pentadecyl, hexadecyl, heptadecyl, octadecyl, and nonadecyl. More preferably, wherein said $C_{1-20}$-alkyl is $C_{8-18}$-alkyl, such as octyl, isooctyl, tridecyl, tetradecyl, pentadecyl, octadecyl. As a commercial example may be mentioned octadecyl-3-(3,5-di-tert-butyl-4-hydroxyphenyl) propionate (SONGNOX® 1076 available from Songwon or Irganox® 1076 available from BASF), Isooctyl-3-(3,5-di-t-butyl-4-hydroxyphenyl)propionate (Irganox® 1135 available from BASF).

Some other non-limiting examples of phenolic antioxidants with only one phenolic group per molecule are also 2-Propyleneacid, 2-isopentane6[(3-isopentane-2-hydroxy-5-isopentane-phenyl)-ethyl]-4-isopentanephenylester; [1,1': 3',1"-Terphenyl]-2'-ol, 5'-(octadecyloxy)-2,6-Di-phenyl-4-octadecyl-cyclo-oxy-phenol; 3-(3,5-Di-tert.-butyl-4-hydroxyphenyl)propionic acid, etc. Some phenolic antioxidants which comprise two or more phenolic groups per molecule are pentaerythritol tetrakis-(3-(3,5-di-t-butyl-4-hydroxyphenyl)propionate), tris(3,5-di-t-butyl-4-hydroxybenzyl)-isocyanurate, and 1,3,5-trimethyl-2,4,6-tris(3, 5-di-t-butyl-4-hydroxybenzyl)benzene. Such antioxidants increase the processing and long-term thermal stability of the resin composition of the invention.

Other examples of possible phenolic antioxidants are 2,2'-methylenebis(4-methyl-6-t-butylphenol), 4,4'-butylidenebis(3-methyl-6-t-butylphenol), 4,4'-thiobis(3-methyl-6-t-butylphenol), 2,2'-thiobis-(4-methyl-6-t-butylphenol), 4,4'-methylenebis(2,6-di-t-butylphenol), 2,2'-methylenebis[6-(1-methylcyclohexyl)-p-cresol], 2,2'-ethylidenebis(2,4-di-t-butylphenol), 2,2'-butylidenebis(2-t-butyl-4-methylphenol), 1,1,3-tris(2-methyl-4-hydroxy-5-t-butylphenyl)butane, triethylene glycol-bis[3-(3-t-butyl-5-methyl-4-hydroxyphenyl)propionate], 1,6-hexanediol-bis[3-(3,5-di-t-butyl-4-hydroxyphenyl)propionate], 2,2-thiodiethylenebis[3-(3,5-di-t-butyl-4-hydroxyphenyl)propionate], N,N'-hexamethylenebis(3,5-di-t-butyl-4-hydroxyhydrocinnamide), 3,5-di-t-butyl-4-hydroxybenzylphosphonate-diethyl ester 1,3,5-tris(2,6-dimethyl-3-hydroxy-4-t-butylbenzyl)isocyanurate, 1,3,5-tris[(3,5-di-t-butyl-4-hydroxyphenyl)propionyloxyethyl]isocyanurate, tris(4-t-butyl-2,6-dimethyl-3-hydroxybenzyl)isocyanurate, 2,4-bis(n-octylthio)-6-(4-hydroxy-3,5-t-butylanilino)-1,3,5-triazine, tetrakis[methylene-3-(3,5-di-t-butyl-4-hydroxyphenyl)propionate] methane, bis(3,5-di-t-butyl-4-hydroxybenzylphosphonic acid ethyl ester) calcium, bis(3,5-di-t-butyl-4-hydroxybenzylphosphonic acid ethyl ester) nickel, bis[3,3-bis(3-t-4-hydroxyphenyl)butyric acid] glycol ester, N,N'-bis[3,5-di-t-butyl-4-hydroxyphenyl)propionyl]hydrazine, 2,2'-oxaimidobis[ethyl-3-(3,5-di-t-butyl-4-hydroxyphenyl)propionate], 2,2'-methylenebis(4-methyl-6-t-butylphenol)terephthalate, 1,3,5-trimethyl-2,4,6-tris(3, 5-di-t-butyl-4-hydroxybenzyl) benzene, 3,9-bis[1,1-dimethyl-2-{β-(3-t-butyl-4-hydroxy-5-methylphenyl) propionyloxy} ethyl]-2,4,8,10-tetraoxaspiro[5,5]-undecane, 2,2-bis[4-(2-)3,5-di-t-butyl-4-hydroxyhydrocinnamoyloxy))-ethoxyphenyl] propane, and alkyl esters of 13-(3,5-di-t-butyl-4-hydroxyphenyl)propionic acid.

Many of these phenolic antioxidants are commercially available. Some examples include Anox® BF (3,5-bis(1,1-dimethyl-ethyl)-4-hydroxy benzene propanic ester of a C14-C15 alcohol blend, available from Great Lakes Chemical Company), Irganox® 245 (triethylene glycol bis(3-t-butyl-4-hydroxy-5-methylphenyl)propionate, available from BASF), Irganox® 259 (hexamethylene bis[3-(3,5-di-t-butyl-4-hydroxyphenyl)propionate], available from BASF), Irganox® 1076 (octadecyl-3-(3,5-di-t-butyl-4-hydroxyphenyl)propionate, available from BASF), and Irganox® 1135 (octyl-3-(3,5-di-t-butyl-4-hydroxyphenyl)propionate, available from BASF).

Some examples include Irganox® 1010 (pentaerythritol tetrakis(3-(3,5-di-t-butyl-4-hydroxyphenyl)propionate, available from BASF), Irganox® 1098 (1,6-hexamethylene bis(3,5-di-t-butyl-4-hydroxyhydrocinnamate, available from BASF), ADK STAB AO-80 (3,9-bis(2-(3-(3-t-butyl-4-hydroxy-5-methyl-phenyl)-propionyl-oxy)-1,1-dimethyl)-2,4, 8,10-tetraoxospiro[5,5]undecane, available from Adeka Palmarole), Topanol® CA (1,1,3-tris(2-methyl-4-hydroxy-5-t-butylphenyl)butane, available from Vertellus Specialties), Irganox® 1330 (1,3,5-trimethyl-2,4,6-tris(3,5-di-t-butyl-4-hydroxybenzyl)benzene, available from BASF), Hostanox® 03 (butyric acid, 3,3-bis(3-t-butyl-4-hydroxyphenyl)ethylene ester, available from Clariant), Irganox® 3114 (1,3,5-tris(3',5'-di-t-butyl-4'-hydroxybenzyl)-s-triazine-2,4,6-(1H, 3H,5H)trione, available from BASF), Cyanox® 1790 (1,3, 5-tris(4-t-butyl-2,6-dimethyl-3-hydroxy-benzyl)-isocyanurate, available from Cytec), and Irganox® 245 (triethylene-glycol-bis-3-(t-butyl-4-hydroxy-5-methyl-phenyl)propionate, available from BASF).

Protective Additives

The present composition comprises from 0.05-1 wt. % of at least one amphiphilic protective additive. According to the present invention one or more protective additives are added to the composition. The present inventors have found that the addition of one or more of these protective additives reduces the emission of objects formed from the composition according to the invention. Without wishing to be bound by any particular theory the inventors believe that this protective additive shields the applied talc, as such prevents talc interaction with antioxidants and consequently reduces the breakdown thereof.

The protective additive according to the present invention has an amphiphilic structure comprising a hydrophilic part and a hydrophobic part, said hydrophobic part preferably comprising at least one alkyl group comprising at least 12 carbon atoms in the backbone. Examples of the hydrophilic part are amide groups. Examples of the hydrophobic parts are one or two saturated and/or unsaturated aliphatic alkyl chains consisting of at least 12, preferably at least 14 carbon atoms. A fatty acid amide may be used as a protective additive; wherein the amide (—NH—CO-) group is the hydrophilic part and the fatty acid alkyl tail is the hydrophobic part.

Amides of saturated or (mono)unsaturated fatty acids may be used, such as 012 (e.g. lauramide=saturated and amide of mono unsaturated 012 fatty acid=mono unsaturated); 014 (e.g. myristamide=saturated and amide of myristoleic acid=mono unsaturated), 016 (e.g. palmitamide=saturated and amide of palmitoleic acid=mono unsaturated), 018 (e.g. stearamide=saturated and oleamide or vaccenamide=mono unsaturated), C20 (e.g. arachidamide=saturated and amide of Paullinic or gondamide=mono unsaturated), C22 (e.g. behenamide=saturated and erucamide=mono unsaturated) fatty acids. In an embodiment, the amide of saturated or (mono)unsaturated fatty acids comprise C12-C20 fatty acids, preferably C14-C16 fatty acids. Oleamide (see structure below) is an amide of the fatty acid oleic acid and is preferably used. Commercially available examples of oleamides are Crodamide 0, OR or ORX supplied by Croda, Polymer Additives.

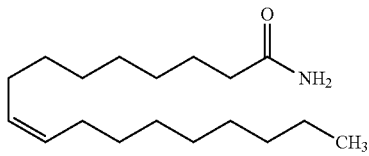 [SMILES: CCCCCCCC/C=C\CCCCCCCC(N)=O]

Another example of a suitable amphiphilic protective additive is the group of bis-amides or N,N'-bis-alkylene fatty acid amides having the general structure formula R—CO—NH—$(CH_2)_n$—NH—CO-R' wherein R and R' are the same or different alkyl or alkenyl groups having about 15 to 21 carbon atoms —CO— is a carbonyl group and n is an integer from 2 to 6. These bis-amides are two amides connected via an alkylene spacer, such as ethylene. Compounds meeting the above definition and description include, by way of example, N,N'-bis-ethylene stearamide, N,N'-bis ethylene oleamide, N,N'-bis ethylene behenamide, N,N'-bis ethylene erucamide, N,N'-bis propylene stearamide, N,N'bis butylene oleamide. As an example thereof ethylene bis stearamide (EBS) may be mentioned (see structure below). Commercially available examples of EBS are Crodamide EBS or EBSV or EBSH).

of at least two of the foregoing additives. Preferred stabilizers include antioxidants, light (UV) stabilizers, and heat stabilizers. Suitable antioxidants are for example synthetic polyphenolic compounds such as tetrakis[methylene-3-(3', 5'-di-t-butyl-4-hydroxyphenyl)propionate] methane; 1,1,3-tris(2-methyl-4-hydroxy-5-t-butylphenyl)butane; 1,3,5-trimethyl-2,4,6-tris(3,5-di-t-butyl-4-hydroxybenzyl) benzene, bis(3,3-bis(4'-hydroxy-3'-t-butylphenyl)butanoic acid]-glycol ester; tris(3,5-di-t-butyl-4-hydroxy benzyl)isocyanurate; 1,3,5-tris(4-t-butyl-2,6-dimethyl-3-hydroxy-benzyl)isocyanurate; 5-di-t-butyl-4-hydroxy-hydrocinnamic acid triester with 1,3,5-tris(2-hydroxyethyl)-s-triazine-2,4,6 (1H, 3H, 5H)-trione; p-cresol/dicyclopenta-diene butylated reaction product; 2,6-bis(2'-bis-hydroxy-3'-t-butyl-5'-methyl-phenyl-4-methyl-phenol).

Suitable additional antioxidants are for example organic phosphites and phosphonites such as triphenyl phosphite, diphenyl alkyl phosphites, phenyl dialkyl phosphites, tris (nonylphenyl) phosphite, trilauryl phosphite, trioctadecyl phosphite, distearyl pentaerythritol diphosphite, tris(2,4-di-tert-butylphenyl) phosphite (also known commercially as Irgafos 168 or as Everfos 168 or Alkanox 240), diisodecyl pentaerythritol diphosphite, distearylpentaerythritol diphosphite, bis(2,6-di-tert-butyl-4-methylphenyl) pentaerythritol diphosphite, bis(2,4,6-tri-tert-butylphenyl) pentaerythritol diphosphite, tetrakis(2,4-di-tert-butylphenyl) 4,4'-biphenylenediphosphonite, bis(2,4-di-tert-butyl-6-methylphenyl) ethyl phosphite.

Suitable additional antioxidants are for example thiosynergists. The thiosynergist may, for example, be selected from the group consisting of dilauryl thiodipropionate, distearyl thiodipropionate, and dimyristyl thiodipropionate and ditridecyl thiodipropionate.

Suitable additional antioxidants are for example hindered amine stabilizers as are disclosed on columns 3-10 of U.S. Pat. No. 6,664,317 which section is incorporated by reference.

Examples of light (UV) stabilizers include benzophenone, benzotriazole and triazine type ultraviolet radiation absorbers, hindered hydroxyl-benzoates and hindered amine compounds. Examples of heat stabilizers include distearyl thio diproprionate (DSTDP). The composition may also comprise acid scavengers for example calcium stearate or zinc stearate. Preferred pigments include titanium dioxide, ultramarine blue, iron oxide, carbon black, phthalocyanines, quinacridones, perylenes, nigrosine and anthraquinones. A commercially available example thereof is PLASBLAK PE4884. Preferred nucleating agents include sodium phe-

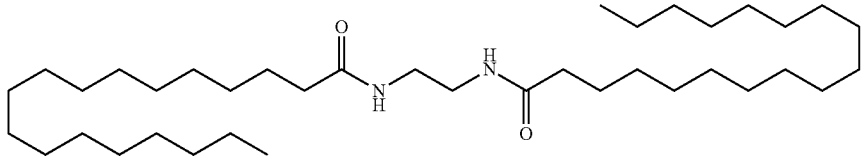 [SMILES: CCCCCCCCCCCCCCCCCC(=O)NCCNC(=O)CCCCCCCCCCCCCCCCC]

Additional Additives

Optionally one or more additional additives may be present in the composition according to the present invention. Examples thereof are discussed below.

The composition may contain from 0-3 wt. % of additional additives such as pigments, dyes, nucleating agents, light (UV) stabilizers, antioxidants, acid scavengers, antistatic agents, lubricants, coupling agent, anti-scratch additives and the like. Obviously the additives may be a mixture nylphosphinate, calcium phenylphosphinate, aluminium oxide, silicon dioxide, and talc powder. Preferred antistatic agents are fatty acid esters ethoxylated alkylamines, diethanolamides, ethoxylated alcohols; commercially available examples thereof are Riken DMG-P(V) which is a distilled monoglyceride or Atmer 129 supplied by Croda Plastic Additives, which is a glycerol monostearate. Preferred lubricants and mold-release agents include ester waxes, pentaerythritol tetrastearate (PETS), long-chain fatty acids (preferably stearic acid or behenic acid) and esters or salts thereof (preferably calcium stearate or zinc stearate), and also amide derivatives (preferably ethylene bis stearamide or montan waxes), straight-chain, saturated carboxylic acids having chain lengths of 28-32 carbon atoms, and also low molecular weight polyethylene waxes or low molecular weight polypropylene waxes. Coupling agents are also called adhesion promoters. The adhesion promoter preferably comprises a modified (functionalized) polymer and optionally a low molecular weight compound having reactive polar groups. Preference is further given to modified polymers containing groups deriving from polar compounds, in particular one or more selected from the group consisting of acid anhydrides, carboxylic acids, carboxylic acid derivatives, primary and secondary amines, hydroxyl compounds, oxazoline and epoxides, and also ionic compounds. Specific examples of such polar compounds are unsaturated cyclic anhydrides and their aliphatic diesters, and the diacid derivatives thereof. In particular, one can use maleic anhydride and compounds selected from C1-C10 linear and branched dialkyl maleates, C1-C10 linear and branched dialkyl fumarates, itaconic anhydride, C1-C10 linear and branched itaconic acid dialkyl esters, maleic acid, fumaric acid, itaconic acid and mixtures thereof. A preferred adhesion promoter is a maleic anhydride functionalized polypropylene, such as a propylene polymer grafted with maleic anhydride. A commercially available example for a suitable adhesion promoter is Exxelor® PO1020 obtainable from ExxonMobil Chemical. Suitable examples of anti-scratch additives are erucamide, oleamide and polydimethylsiloxane.

For the avoidance of doubt it is noted that these additives are combined separately with the propylene-based matrix. However, the propylene-based matrix may already contain certain additives, in particular anti-oxidants as is known in the art per se.

Thermoplastic Composition—Parameters

The composition according to the present invention can be manufactured by melt blending the individual components according to any conventional procedure known in the art. Melt mixing devices suited for this process are discontinuous and continuous kneaders, twin screw extruders and single screw extruders with special mixing sections and co-kneaders. With melt-mixing is meant that the components are mixed with the heterophasic propylene copolymer at a temperature that exceeds the melting point of the heterophasic propylene copolymer. Melt-mixing may be done using techniques known to the skilled person, for example in an extruder. Generally, in the process of the invention, melt-mixing is performed at a temperature in the range from 20-260° C. Suitable conditions for melt-mixing, such as temperature, pressure, amount of shear, screw speed and screw design when an extruder is used are known to the skilled person. When using an extruder, a conventional extruder such as a twin-screw extruder may be used. The temperature can vary through the different zones of the extruder as required. For example, the temperature may vary from 180° C. in the feed zone to 260° C. at the die. Preferably, the temperature in the extruder varies from 200 to 260° C.

The composition may be made by compounding the several components. When using HAR talc it is preferred to take certain precautions as the high lamellarity of the particles makes them fragile. A preferable method is to introduce the HAR talc into the polymer melt using a side feeder.

The invention relates to all possible combinations of features described herein, preferred in particular are those combinations of features that are present in the claims. It is further noted that the term 'comprising' does not exclude the presence of other elements. However, it is also to be understood that a description on a product comprising certain components also discloses a product consisting of these components.

Similarly, it is also to be understood that a description on a process comprising certain steps also discloses a process consisting of these steps. The range of values "A to B" or "A-B" used herein is understood to mean "at least A and at most B". The invention is now elucidated by way of the following examples, without however being limited thereto.

The present invention also relates to an (semi)-exterior automotive part prepared from a thermoplastic composition comprising from 48-95 wt. % based on the weight of the composition of at least one heterophasic propylene copolymer;

from 0-20 wt. % based on the weight of the composition of an ethylene-α-olefin elastomer comprising ethylene and at least one C3 to 010 α-olefin;

from 1-30 wt. %, preferably from more than 5 up to 30 wt. % based on the weight of the composition of high aspect ratio (HAR) talc as a filler;

from 0.05-1 wt. % based on the weight of the composition of a phenolic antioxidant additive;

from 0.05-1 wt. % based on the weight of the composition of at least one amphiphilic protective additive comprising a hydrophilic part and a hydrophobic part, wherein said hydrophobic part preferably comprises at least one substituted or un-substituted alkyl group having at least 12 carbon atoms; and from 0-3 wt. % based on the weight of the composition of one or more additional additives.

Measurement Methods

Melt flow index: (MFI) Unless explicitly stated otherwise herein, the melt flow index was measured according to ISO 1133 (2005) (2.16 kg, 230° C.). The unit of MFI is g/10 min. It should be noted that the Melt Flow Index (MFI) and the Melt Flow Rate (MFR) are used interchangeably.

The impact strength was determined by measuring the Izod impact strength determined according to ISO 180-1A (2000) [Test geometry: 65*12.7*3.2 mm, notch 45° according to ISO 37-2 (2011) in perpendicular orientation] at −20° C., 0° C. and 23° C.; P denotes partial breakage, B denotes complete breakage (brittle), T denotes no breakage (tough). The unit of the Izod impact strength is $kJ/m^2$.

The flexural modulus was determined according to ISO 178 (2010) at 23° C., the unit is $N/mm^2$ or MPa.

Intrinsic viscosity of the propylene polymer ($IV_{DP}$) and of the α-olefin copolymer ($IV_{EPR}$) were determined according to ISO-1628-1 (2009) and ISO-1628-3 (2010) based on the amounts of xylene-soluble matter (CXS) and xylene-insoluble matter (CXI) measured according to ISO 16152 (2005).

Tiger stripes are measured according to the following procedure. After molding, each of the specimens is visually observed for occurrence of tiger stripes on its smooth side and textured side. The quality of the surface is evaluated on a scale of 1 to 10, with 10 being the best, as described in Table below.

1 very sharp transition between glossy and dull sections visible seen from any angle
2 sharp transitions between glossy and dull sections seen from any angle
3 very visible transitions between glossy and dull sections seen from any angle
4 visible transitions between glossy and dull sections seen from any angle
5 less visible transitions between glossy and dull sections seen from any angle
6 visible transitions between glossy and dull sections seen from a specific angle only
7 less visible transitions between glossy and dull sections seen from a specific angle only
8 no transitions between glossy and dull sections visible and surface appearance inhomogeneous
9 no transitions between glossy and dull sections visible and surface appearance homogeneous
10 no transitions between glossy and dull sections visible and surface is perfect The average tiger stripe rating is defined as the numerical average of the individual tiger stripe ratings for each of the test specimens manufactured at low, medium and high speed, manufactured with the pin-gate and the fan-gate and measured on the smooth and on the textured surface. Hence, the average tiger stripe rating as defined herein is the average of 12 individual tiger stripe measurements.

The tensile modulus as measured according to ISO 527-2(1A) (2012) at 1 mm/min at 23° C. of the composition is preferably at least 1400 MPa. Preferably, the tensile modulus of the composition is at least 1600 MPa, more preferably at least 2000 MPa, even more preferably at least 2400 MPa. The upper limit of the tensile modulus can be as high as 3000 MPa, such as 2800 MPa.

The stress at yield as measured according to ISO 527-2 (1A) (2012) at 23° C. of the propylene-based matrix is preferably at least 19 MPa. Preferably, the stress at yield of the propylene-based matrix is 20 MPa or more, more preferably 21 MPa or more. The upper limit of the stress at yield can be as high as 26 MPa, such as 24 MPa, or 22 MPa.

The average ash content is measured according to ISO 3451 (2008) after heating for 4 hours at 600° C. Mold shrinkage, in the context of this invention called shrinkage, is the amount of contraction that a molded part undergoes when it is removed from the mold cavity and cooled at room temperature. Shrinkage was measured according to ISO 294-4 (2001) on 65×65×3.2 mm injection molded plaques after a conditioning time of 24 h after molding at room temperature (23° C.) and ≤0% relative humidity. Each of the samples was molded using the same conditions at the molding machine. Shrinkage measured in the flow length and perpendicular to the flow is reported here. The following equation was used to determine shrinkage:

$$\frac{L_m - L_s}{L_m} \times 100 = \text{shrinkage}[\%]$$

wherein $L_m$ is the length of the mold in the considered direction, and $L_s$ is the length of the specimen in considered direction. A shrinkage in the flow direction, a shrinkage in the perpendicular direction to flow direction, as well as an average (arithmetic) of both shrinkage values is reported. The unit of the average shrinkage is percentage (%). The shrinkage is also measured after annealing, viz. after heating to a temperature of 90° C. for 1 hour. The unit of the average shrinkage after annealing is percentage (%). Warpage is determined by the same measurement method as shrinkage; it is a ratio. The warpage is also measured after annealing, viz. after heating to a temperature of 90° C. for 1 hour.

Bumper Fascia

The automotive part, e.g. bumper fascia according to the invention can be a semi-finished or finished article made from the propylene-based matrix by a molding process, such as injection molding or blow molding. In an embodiment the composition may be shaped by means of extrusion so that the container, at least in part, is made by means of extrusion.

Cowl Top

The automotive part, e.g. cowl top according to the invention can be a semi-finished or finished article made from the propylene-based matrix by a molding process, such as injection molding or blow molding. In an embodiment the composition may be shaped by means of extrusion so that the container, at least in part, is made by means of extrusion.

Method

In a further aspect the present invention relates to a method for the manufacture of an exterior or semi-exterior automotive part as described herein comprising thermoforming or injection molding the composition as defined herein. In yet a further aspect the present invention relates to a composition as defined herein, preferably for the use for the manufacture of an exterior or semi-exterior automotive part. Preferred embodiments of this invention are described herein. Variation of those preferred embodiments may become apparent to those of ordinary skill in the art upon reading the foregoing description. For the purpose of clarity and a concise description features are described herein as part of the same or separate embodiments. However, it will be appreciated that the scope of the invention may include embodiments having combinations of all or some of the features described. The invention will now be further illustrated by the following non-limiting examples.

EXAMPLES

In the experiments the following non-limiting materials were used. All of the heterophasic copolymers are reactor grade materials, i.e. are non-shifted or non-visbroken grades. All of the components are melt-mixed together to form a molding composition.

As available examples of suitable heterophasic propylene copolymers, the following may be mentioned.

PP01: this is a heterophasic propylene copolymer commercially available from SABIC having a MFI of 70 g/10 min, a C2/C3 (viz. ethylene-propylene) rubber content (RC) of about 18 wt. % and a C2 content of the rubber phase (RCC2) of about 54 wt. %.

PP02: this is a heterophasic propylene copolymer commercially available from SABIC having a MFI of 33 g/10 min, a C2/C3 rubber content (RC) of about 18 wt. % and a C2 content of the rubber phase (RCC2) of about 54 wt. %.

PP06: this is a heterophasic propylene copolymer commercially available from SABIC having a MFI of 33 g/10 min, a C2/C3 rubber content (RC) of about 18 wt. % and a C2 content of the rubber phase (RCC2) of about 54 wt. %, which has a lower VOC and FOG value than PP02.

PP07: this is a homopropylene with a MFI of 44 g/10 min.

Talc 1 according to the invention is a HAR talc having a lamellarity of 4.8

Talc 2 is another talc, being an ultrafine talc having a lamellarity index of less than 2.8.

Phenolic antioxidant mixture: a mixture of 50 wt. % of pentaerythritol tetrakis(3-(3,5-di-tert-butyl-4-hydroxyphenyl)propionate and ≤0 wt. % of tris(2,4-di-tert-butylphenyl) phosphite.

As a heat stabilizer distearyl thio diproprionate (DSTDP) is used.

As a light stabilizer a hindered amine (HALS) is used.

As antistatic agent a glycerol monostearate ester is used.

As a first protective agent (Prot.ag. 1) an ethylene bis stearamide is used. As a second protective agent (Prot.ag. 2) an oleamide is used.

CMB stands for color master batch.

As the ethylene α-olefin elastomers are used: elastomer 1) being Ethylene based elastomer having a density of 0.861 g/cm3 and a MFI of 0.9 g/10 min (ASTM D1238, 2.16 kg, 190° C.); elastomer 2) being an polyolefin elastomer having a density of 0.870 g/cm3 and a MFI of 5 g/10 min (ASTM D1238, 2.16 kg, 190° C.).

Examples for Exterior Automotive Parts

TABLE 1

| Molding composition (wt. %) | CE1 | CE2 | E1 | E2 | E3 |
|---|---|---|---|---|---|
| PP01 | 62.6 | 62.6 | 62.4 | 62.6 | 62.6 |
| Elastomer 1 | 14 | 14 | 14 | 14 | 14 |
| Talc 1 | 22 | 0.0 | 22 | 22 | 22 |
| Talc 2 | 0.0 | 22 | 0.0 | 0.0 | 0.0 |
| Phenolic antioxidant | 0.2 | 0.2 | 0.2 | 0.2 | 0.2 |
| Antistatic agent | 0.2 | 0.2 | 0.0 | 0.0 | 0.0 |
| Prot. ag. 1 | 0.0 | 0.0 | 0.2 | 0.1 | 0.2 |
| Prot. ag. 2 | 0.0 | 0.0 | 0.2 | 0.1 | 0.0 |
| CMB | 1 | 1 | 1 | 1 | 1 |
| Total | 100 | 100 | 100 | 100 | 100 |

As clearly seen from Table 1 above there are no protective additives in the comparative example. Example 1 has two protective additives, Example 2 also has two protective additives, and Example 3 has one protective additive. These four compositions have been tested for several features, such as MFI, Izod impact strength, flexural modulus, average shrinkage, warpage, VOC, TVOC and FOG; the data are shown below in Table 2.

TABLE 2

| Features | CE1 | CE2 | E1 | E2 | E3 |
|---|---|---|---|---|---|
| MFI | 17.6 | 20.2 | 18.2 | 16.6 | 17.9 |
| Izod strength at 23° C. | 25.4 B | 27.8 B | 26.4 B | 25.1 B | 25.0 B |
| Izod strength at 0° C. | 11.1 B | 11.0 B | 13.1 B | 12.1 B | 10.3 B |
| Flexural modulus | 2436 | 2060 | 2426 | 2448 | 2474 |
| Average shrinkage | 0.59 | 0.74 | 0.63 | 0.60 | 0.61 |
| Average shrinkage after annealing | 0.64 | 0.82 | 0.67 | 0.67 | 0.67 |
| Warpage | 1.18 | 1.12 | 1.14 | 1.19 | 1.17 |
| Warpage after annealing | 1.21 | 1.18 | 1.18 | 1.21 | 1.20 |
| VOC value | 97.9 | 98.4 | 78.1 | 77 | 63.4 |
| FOG value | 387 | 425 | 442 | 339 | 331 |
| TVOC granules | 8 | 2 | 9 | 7 | 9 |
| TVOC plaques | 207 | 87 | 13 | 31 | 24 |

From the above date is can be seen that the VOC and TVOC values are decreased and hence the emission has decreased. Hence one or more of the objects of the invention are accomplished by the invention as defined in the appending claims. In addition, other relevant parameters do not significantly change therefore, the present invention does not jeopardize the performance of the reinforced articles prepared from the composition.

Examples for Semi-Exterior Automotive Parts

TABLE 3

| Molding composition (wt. %) | CE3 | E4 | E5 | E6 |
|---|---|---|---|---|
| PP07 | 37.1 | 37.1 | 37.1 | 37.1 |
| PP02 | 0.0 | 0.0 | 0.0 | 30 |
| PP06 | 30 | 30 | 30 | 0.0 |
| Elastomer 1 | 14 | 14 | 14 | 14 |
| Elastomer 2 | 6 | 6 | 6 | 6 |
| Talc 1 | 10 | 10 | 10 | 10 |
| Phenolic antioxidant mixture | 0.1 | 0.1 | 0.1 | 0.1 |
| Antistatic agent | 0.3 | 0.0 | 0.0 | 0.0 |
| Heat stabilizer | 0.1 | 0.1 | 0.1 | 0.1 |
| Prot. Ag. 1 | 0.0 | 0.3 | 0.15 | 0.15 |
| Prot. Ag. 2 | 0.0 | 0.0 | 0.15 | 0.15 |
| Light stabilizer | 0.4 | 0.4 | 0.4 | 0.4 |
| CMB | 2 | 2 | 2 | 2 |

As clearly seen from Table 3 above there are no protective additives in comparative example 3. Example 4 has one protective additive, Example 5 and 6 have two protective additives. These four compositions have been tested for several features, such as MFI, Izod impact strength, flexural modulus, average shrinkage, warpage, VOC, TVOC and FOG; the data are shown below in Table 4.

TABLE 4

| Features | CE3 | E4 | E5 | E6 |
|---|---|---|---|---|
| Average Ash content (%) | 9.9 | 10 | 10 | 10 |
| MFI | 16.0 | 17.0 | 15.6 | 18.5 |
| Izod strength at 23° C. | 31.1 B | 27.8 B | 25.9 B | 30.2 B |
| Flexural modulus | 1558 | 1530 | 1586 | 1562 |
| Average shrinkage | 0.96 | 0.89 | 0.94 | 0.87 |
| Average shrinkage after annealing | 1.06 | 0.99 | 1.03 | 0.94 |
| Warpage | 1.13 | 1.17 | 1.15 | 1.12 |
| Warpage after annealing | 1.16 | 1.19 | 1.15 | 1.15 |
| VOC value | 41.8 | 49.4 | 45.2 | 62.6 |
| FOG value | 235 | 239 | 383 | 559 |
| TVOC granules | 39 | 18 | 39 | 31 |
| TVOC plaques | 33.8 | 18.0 | 27.5 | 24.3 |

From the above date is can be seen that the VOC and TVOC values are decreased and hence the emission has decreased. Hence one or more of the objects of the invention are accomplished by the invention as defined in the appending claims. In addition, other relevant parameters do not significantly change therefore, the present invention does not jeopardize the performance of the reinforced articles prepared from the composition.

The invention claimed is:

1. An exterior or semi-exterior automotive part prepared from a thermoplastic composition comprising
from 48-95 wt. % based on the total weight of the composition of at least one heterophasic propylene copolymer;
from 0-20 wt. %, based on the total weight of the composition of an ethylene-α-olefin elastomer comprising ethylene and at least one C3 to C10 α-olefin;
from 1-30 wt. %, based on the total weight of the composition of high aspect ratio (HAR) talc as a filler;
from 0 to 5 wt. % based on the total weight of the composition of another talc;
from 0.05-1 wt. % based on the total weight of the composition of a phenolic antioxidant additive;
from 0.05-1 wt. % based on the total weight of the composition of at least one amphiphilic protective additive comprising a hydrophilic part and a hydrophobic part; and
from 0-3 wt. % based on the total weight of the composition of one or more additional additives
wherein less than 0.01 wt. % based on the total weight of the composition of another talc is present and/or wherein less than 0.01 wt. % based on the total weight of the composition of glass is present and/or wherein less than 0.01 wt. % based on the total weight of the composition of high density polyethylene (HPDE) is present and/or wherein less than 0.01 wt. % based on the total weight of the composition of styrene-ethylene-butylene-styrene (SEBS) is present,
wherein the total weight of the composition is equal to 100%;
wherein the heterophasic propylene copolymer comprises one of (A), (B), or (C):
(A) from 70 to 92 wt. % based on the weight of said heterophasic propylene copolymer of a propylene-based matrix consisting of a polypropylene having a melt flow index of at least 150 g/10 min as determined by ISO1133 (2005) at 230° C. and 2.16 kg; and wherein the propylene polymer has an intrinsic viscosity $IV_{pp}$; from 8 to 30 wt. % based on the weight of said heterophasic propylene copolymer of a dispersed ethylene-α-olefin copolymer having an ethylene content of between 10 and 55 wt. % based on the weight of the ethylene-α-olefin copolymer and wherein the ethylene-α-olefin copolymer has an intrinsic viscosity $IV_{EPR}$; and
wherein the ratio of $IV_{EPR}/IV_{PP}$ is between 3 and 7 wherein $IV_{PP}$ and $IV_{EPR}$ are determined according to ISO-1628-1 (2009) and -3 (2010) based on the amount of the xylene-soluble matter (CXS) and xylene-insoluble matter (CXI) measured according to ISO 16152 (2005);
(B) from 70 to 90 wt. % based on the weight of the heterophasic propylene copolymer of a polypropylene-based matrix consisting of a polypropylene having a melt flow index of from 55 to 85 g/10 min as measured according to ISO 1133 (2005) (2.16 kg and 230° C.); and from 10 to 45 wt. % based on the weight of the heterophasic propylene copolymer of a dispersed-ethylene-α-olefin copolymer having a melt flow index of from 2.5 to 5.0 g/10 min as measured according to ISO 1133 (2005) (2.16 kg and 230° C.); wherein the sum of the polypropylene-based matrix and the dispersed ethylene-α-olefin copolymer is 100 wt. %; or
(C) from 60 to 85 wt. % based on the weight of the heterophasic propylene copolymer of a polypropylene-based matrix consisting of a polypropylene having a melt flow index of from 50 to 100 g/10 min as measured according to ISO 1133 (2005) (2.16 kg and 230° C.); and from 15 to 40 wt. % based on the weight of the heterophasic propylene copolymer of a dispersed ethylene-α-olefin copolymer having a melt flow index of from 0.050 to 0.30 g/10 min as measured according to ISO 1133 (2005) (2.16 kg and 230° C.), wherein the sum of the polypropylene-based matrix and the dispersed ethylene-α-olefin copolymer is 100 wt. %.

2. An exterior or semi-exterior automotive part prepared from a thermoplastic composition consisting of:
a) from 48-95 wt. % based on the weight of the composition of at least one heterophasic propylene copolymer;
b) from 0-20 wt. %, based on the weight of the composition of an ethylene-α-olefin elastomer comprising ethylene and at least one C3 to C10 α-olefin;
c) from 1-30 wt .%, based on the weight of the composition of high aspect ratio (HAR) talc as a filler;
d) from 0to 5 wt. % based on the weight of the composition of another talc;
e) from 0.05-1 wt. % based on the weight of the composition of a phenolic antioxidant additive;
f) from 0.05-1 wt. % , based on the weight of the composition of at least one amphiphilic protective additive comprising a hydrophilic part and a hydrophobic part; and
g) from 0- 3 wt. % based on the weight of the composition of one or more additional additives; and
wherein the total of a), b), c), d), e), f) and g) is 100 wt. %.

3. The exterior or semi-exterior automotive part according to claim 1, wherein the amphiphilic protective additive is chosen from the group of fatty acid amides and bis-amides or N,N'-bis-alkylene fatty acid amides having the general structure formula R—CO—NH—$(CH_2)_n$—NH—CO—R' wherein R and R' are the same or different alkyl or alkenyl groups having about 15 to 21 carbon atoms —CO— is a carbonyl group and n is an integer from 2 to 6.

4. The exterior or semi-exterior automotive part according to claim 1,
wherein the composition has a melt flow index between 5 and 70g/10 min as determined in accordance with ISO 1133 (2005) (2.16 kg, 230° C.) and/or wherein the composition has a tensile modulus as measured in accordance with ISO 527-2(1A) (2012) at 23° C. of at least 1400 MPa and/or wherein the composition has an Izod impact strength determined according to ISO 180-1A (2000) of at least 1.5 kJ/m$^2$ at −20° C. and/or at least 35 kJ/m$^2$ at 23° C. (tough failure) and/or wherein the composition has a flexural modulus measured according to ISO 178 (2010) at 23 ° C. of at least 1300 MPa and/or wherein the composition has an Izod impact strength determined according to ISO 180-1A (2000) of at least 1.5 kJ/m$^2$ at 0° C. and/or at least 10 kJ/m$^2$ at 23° C. and/or wherein the composition has a flexural modulus measured according to ISO 178 (2010) at 23° C. of at least 1300 MPa.

5. The exterior or semi-exterior automotive part according to claim 1, wherein the high aspect ratio (HAR) talc has a lamellarity of at least 2.8.

6. The exterior or semi-exterior automotive part according to claim 1, wherein the composition has an emission of volatile organic compounds (VOCs) as measured according to the standard procedure VDA 278 (2011) of at most 250 microgram/gram and/or wherein the composition has an emission of Total carbon emission (TVOCs) as measured according to the standard procedure VDA 277 (1995) of at most 50 microgram of carbon/gram.

7. The exterior or semi-exterior automotive part according to claim 1, wherein a light stabilizer is present as additional additive.

8. A method for the manufacture of the exterior or semi-exterior automotive part according to claim 1 comprising injection molding the composition.

9. The exterior or semi-exterior automotive part according to claim 7, having a tiger stripe value of at least 5.

10. The exterior or semi-exterior automotive part according to claim 7, having a tiger stripe value of at least 7.

11. The exterior or semi-exterior automotive part according to claim 2, wherein the additional additives is selected from the group consisting of a pigment, a dye, a nucleating agent, a light (UV) stabilizer, an antioxidant, an acid scavenger, an antistatic agent, a lubricant, a coupling agent, or an anti-scratch additive.

* * * * *